US011830002B2

(12) United States Patent
Igarashi

(10) Patent No.: US 11,830,002 B2
(45) Date of Patent: Nov. 28, 2023

(54) CUSTOMER INFORMATION REGISTRATION APPARATUS

(71) Applicant: NEC Corporation, Tokyo (JP)

(72) Inventor: Makoto Igarashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 318 days.

(21) Appl. No.: 17/278,747

(22) PCT Filed: Aug. 28, 2019

(86) PCT No.: PCT/JP2019/033746
§ 371 (c)(1),
(2) Date: Mar. 23, 2021

(87) PCT Pub. No.: WO2020/066444
PCT Pub. Date: Apr. 2, 2020

(65) Prior Publication Data
US 2022/0036359 A1 Feb. 3, 2022

(30) Foreign Application Priority Data
Sep. 26, 2018 (JP) ................................. 2018-180213

(51) Int. Cl.
G06Q 20/40 (2012.01)
G06V 40/16 (2022.01)

(52) U.S. Cl.
CPC ....... *G06Q 20/4014* (2013.01); *G06V 40/161* (2022.01); *G06V 40/168* (2022.01)

(58) Field of Classification Search
CPC ............. G06Q 20/4014; G06Q 20/206; G06Q 20/40145; G06Q 30/0201; G06Q 20/20;
(Continued)

(56) References Cited

U.S. PATENT DOCUMENTS 11,354,683 B1 * 6/2022 Shin .................. G06Q 30/0201
2002/0010622 A1 1/2002 Okamoto et al.
(Continued)

FOREIGN PATENT DOCUMENTS

JP 2002-032558 A 1/2002
JP 2005-141584 A 6/2005
(Continued)

OTHER PUBLICATIONS

International Search Report for PCT Application No. PCT/JP2019/033746, dated Dec. 3, 2019.
(Continued)

*Primary Examiner* — Nimesh Patel

(57) ABSTRACT

A customer information registration apparatus includes: a matching unit configured to match face data of a customer based on image data acquired by a camera in a shop against face data stored in a storage unit; a storing unit configured to store face data which is not stored in the storage unit into the storage unit in a case where the matching by the matching unit fails; a behavior information acquisition unit configured to acquire behavior information according to a behavior in the shop of the customer; a condition determination unit configured to determine whether or not to delete the face data stored in the storage unit based on the behavior information acquired by the behavior information acquisition unit; and a deletion unit configured to delete the face data stored in the storage unit based on a result of the determination by the condition determination unit are provided.

12 Claims, 10 Drawing Sheets

(58) Field of Classification Search
CPC ........... G06Q 30/0269; G06Q 20/4016; G06Q 30/0255; G06Q 20/425; G06Q 30/01; G06Q 30/0224; G06Q 30/0641; G06Q 30/0631; G06Q 30/0283; G06Q 20/382; G06Q 30/015; G06Q 50/184; G06V 40/161; G06V 40/168; G06V 10/74; G06V 20/52; G06V 40/172; G06V 20/20; G06V 40/174; G06V 10/82; G06V 40/173; G06V 10/764; G06V 10/255; G06V 2201/10; G06V 40/16; G06V 40/171; G06V 40/10; G06V 40/167; G06V 40/20; G06V 10/772; G06V 40/165; G06V 40/40; G06V 20/44; G06V 10/245; G06V 2201/07; G06V 40/197; G06V 40/18; G06V 10/40; G06V 40/50; G06V 20/49; G06V 20/53; G06V 20/80; G06V 2201/05; G06V 40/25; G06V 40/70; G06V 10/10; G06V 20/64; G06V 20/653; G06V 2201/12; G06V 30/194; G06V 40/176; G06V 40/178; G06F 21/32; G06F 3/017; G06F 18/22; G06F 18/00; G06F 18/24; G06F 18/28; G06F 16/784; G06F 2221/2111; G06F 18/2431; G06F 21/31; G06F 40/295; G06F 16/9535; G06F 17/18; G06F 21/6209; G06F 21/6227; G06F 2221/2117

See application file for complete search history.

(56) References Cited

U.S. PATENT DOCUMENTS

| | | | | |
|---|---|---|---|---|
| 2007/0294207 | A1* | 12/2007 | Brown | G07G 1/0036 |
| 2008/0243614 | A1* | 10/2008 | Tu | G06Q 30/02 |
| | | | | 705/14.66 |
| 2011/0199486 | A1* | 8/2011 | Moriya | G06Q 30/02 |
| | | | | 348/150 |
| 2014/0161316 | A1* | 6/2014 | Golan | G06F 16/5866 |
| | | | | 382/103 |
| 2014/0358639 | A1 | 12/2014 | Takemoto et al. | |
| 2016/0104174 | A1* | 4/2016 | Matsumoto | G06V 20/53 |
| | | | | 705/7.29 |
| 2017/0075993 | A1* | 3/2017 | Matsushita | G06V 10/96 |

FOREIGN PATENT DOCUMENTS

| | | |
|---|---|---|
| JP | 2009-009231 A | 1/2009 |
| JP | 2009-284167 A | 12/2009 |
| JP | 2014-232495 A | 12/2014 |
| JP | 2015-130155 A | 7/2015 |
| JP | 2016-126749 A | 7/2016 |
| JP | 2017-139010 A | 8/2017 |
| WO | 2018/042549 A1 | 3/2018 |

OTHER PUBLICATIONS

Japanese Office Communication for JP Application No. 2020-548234 dated May 17, 2022 with English Translation.

* cited by examiner

CUSTOMER INFORMATION REGISTRATION APPARATUS

This application is a National Stage Entry of PCT/JP2019/033746 filed on Aug. 28, 2019, which claims priority from Japanese Patent Application 2018-180213 filed on Sep. 26, 2018, the contents of all of which are incorporated herein by reference, in their entirety.

TECHNICAL FIELD

The present invention relates to a customer information registration apparatus, a customer information registration method, a recording medium, a camera, and a customer information registration system.

BACKGROUND ART

For purposes such as marketing, information indicating a feature value calculated based on a face image of a customer may be registered and managed.

One of such techniques is described in, for example, Patent Document 1. In Patent Document 1, a customer information management system that registers an attribute of a customer into a customer database (DB) and manages is described. According to Patent Document 1, an attribute of a customer is registered into the customer database when the customer purchases a product at a cash register or when the customer leaves a shop without purchasing a product.

Patent Document 1: Japanese Unexamined Patent Application Publication No. JP-A 2002-032558

According to the technique described in Patent Document 1, an attribute of a customer is registered into the customer database regardless of the behavior of the customer in a shop. As a result, problems such as bloated data capacity and increase of data with low usefulness arise.

SUMMARY

Accordingly, an object of the present invention is to provide a customer information registration apparatus, a customer information registration method, a recording medium, a camera, and a customer information registration system which solve a problem that it is difficult to suppress bloated data capacity and increase of data with low usefulness.

In order to achieve the object, a customer information registration apparatus as an aspect of the present invention includes: a matching unit configured to match face data of a customer based on image data acquired by a camera in a shop against face data stored in a storage unit; a storing unit configured to store face data which is not stored in the storage unit into the storage unit in a case where the matching by the matching unit fails; a behavior information acquisition unit configured to acquire behavior information according to a behavior in the shop of the customer; a condition determination unit configured to determine whether or not to delete the face data stored in the storage unit based on the behavior information acquired by the behavior information acquisition unit; and a deletion unit configured to delete the face data stored in the storage unit based on a result of the determination by the condition determination unit.

Further, a customer information registration method as another aspect of the present invention includes: matching face data of a customer based on image data acquired by a camera in a shop against face data stored in the storage unit; storing face data which is not stored in the storage unit into the storage unit in a case where the matching fails; acquiring behavior information according to a behavior in the shop of the customer; determining whether or not to delete the face data stored in the storage unit based on the acquired behavior information; and deleting the face data stored in the storage unit based on a result of the determination.

Further, a recording medium as another aspect of the present invention is a non-transitory computer-readable recording medium having a program recorded thereon. The program includes instructions for causing a customer information registration apparatus including a storage unit to realize: a matching unit configured to match face data of a customer based on image data acquired by a camera in a shop against face data stored in a storage unit; a storing unit configured to store face data which is not stored in the storage unit into the storage unit in a case where the matching by the matching unit fails; a behavior information acquisition unit configured to acquire behavior information according to a behavior in the shop of the customer; a condition determination unit configured to determine whether or not to delete the face data stored in the storage unit based on the behavior information acquired by the behavior information acquisition unit; and a deletion unit configured to delete the face data stored in the storage unit based on a result of the determination by the condition determination unit.

Further, a camera as another aspect of the present invention includes: a matching unit configured to match face data of a customer based on acquired image data against face data stored in a storage unit; a storing unit configured to store face data which is not stored in the storage unit into the storage unit in a case where the matching by the matching unit fails; a behavior information acquisition unit configured to acquire behavior information according to a behavior in the shop of the customer; a condition determination unit configured to determine whether or not to delete the face data stored in the storage unit based on the behavior information acquired by the behavior information acquisition unit; and a deletion unit configured to delete the face data stored in the storage unit based on a result of the determination by the condition determination unit.

Further, a customer information registration system as another aspect of the present invention is a customer information registration system including a customer information registration apparatus and a camera. The customer information registration apparatus includes: a matching unit configured to match face data of a customer based on image data acquired by a camera in a shop against face data stored in a storage unit; a storing unit configured to store face data which is not stored in the storage unit into the storage unit in a case where the matching by the matching unit fails; a behavior information acquisition unit configured to acquire behavior information according to a behavior in the shop of the customer; a condition determination unit configured to determine whether or not to delete the face data stored in the storage unit based on the behavior information acquired by the behavior information acquisition unit; and a deletion unit configured to delete the face data stored in the storage unit based on a result of the determination by the condition determination unit.

With the configurations described above, the present invention can provide a customer information registration apparatus, a customer information registration method, a recording medium, a camera, and a customer information registration system which solve the problem that it is difficult to suppress bloated data capacity and increase of data with low usefulness.

EXAMPLE EMBODIMENTS

First Example Embodiment

Figure 1:
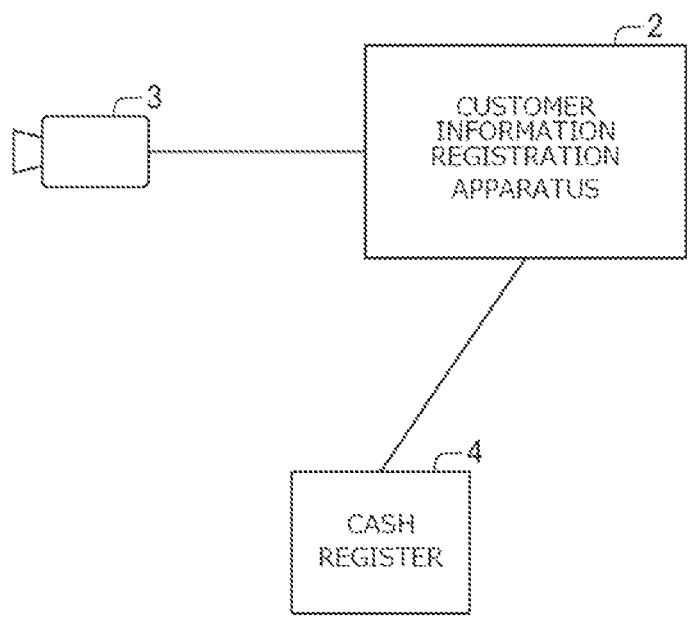
FIG. 1 is a view showing an example of an entire configuration of a customer information registration system in a first example embodiment of the present invention.
Figure 2:
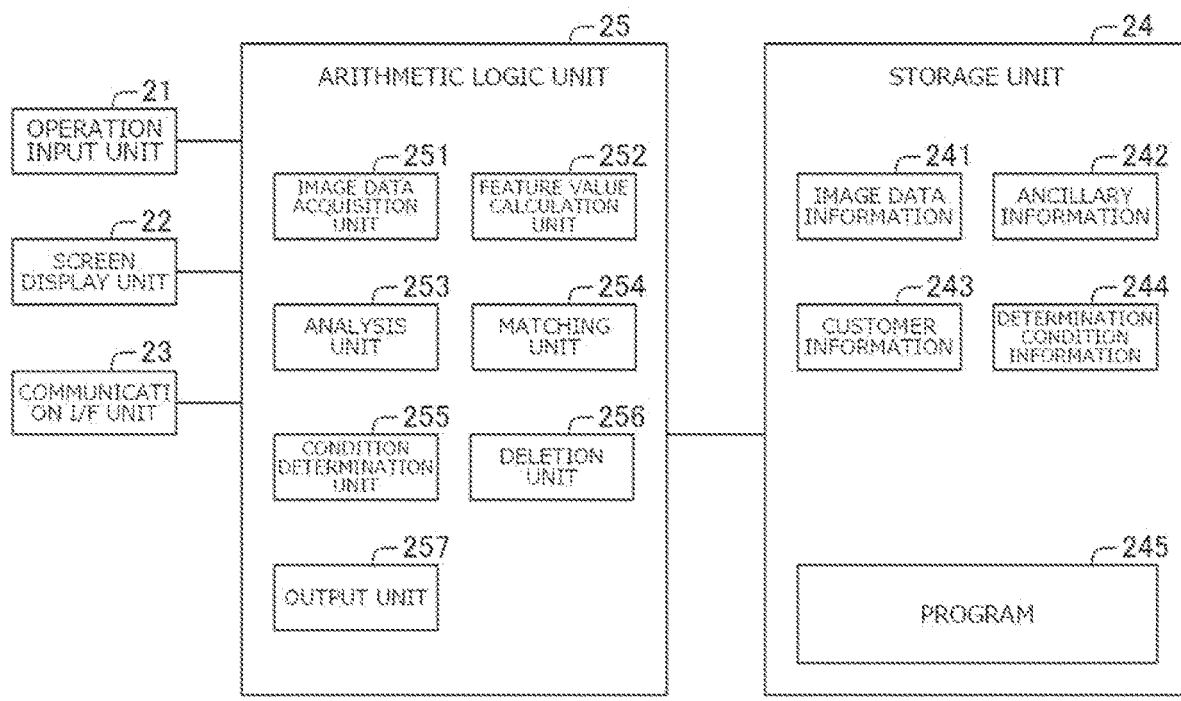
FIG. 2 is a block diagram showing an example of a configuration of a customer information registration apparatus shown in FIG. 1.
Figure 3:
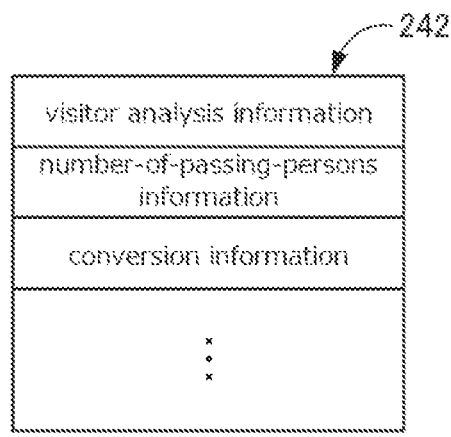
FIG. 3 is a view showing an example of ancillary information shown in FIG. 2.
Figure 4:
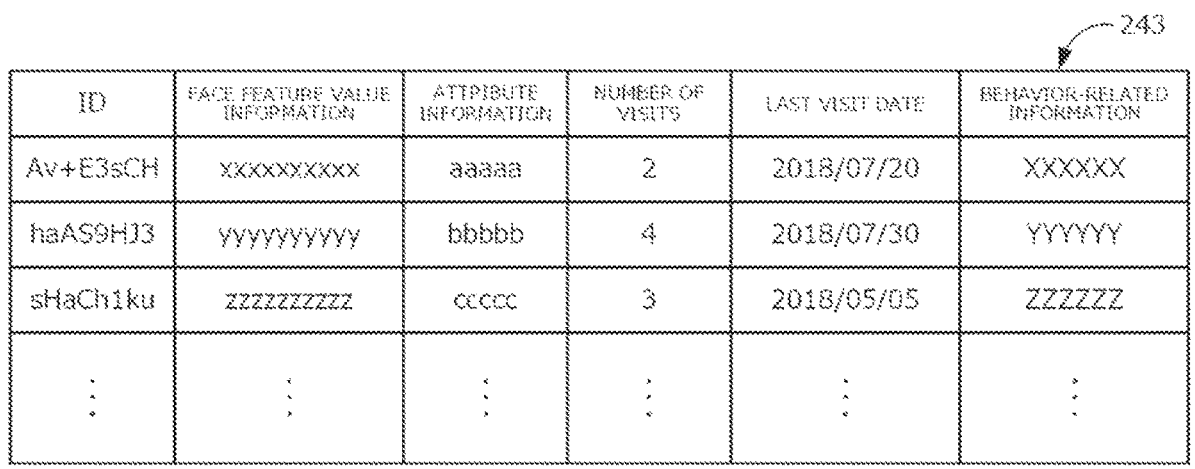
FIG. 4 is a view showing an example of customer information shown in FIG. 2.
Figure 5:
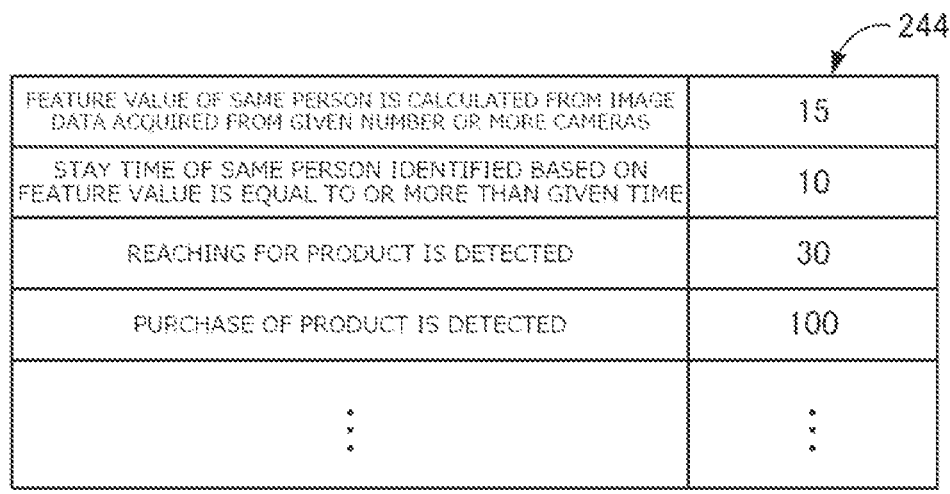
FIG. 5 is a view showing an example of determination condition information shown in FIG. 2.
Figure 6:
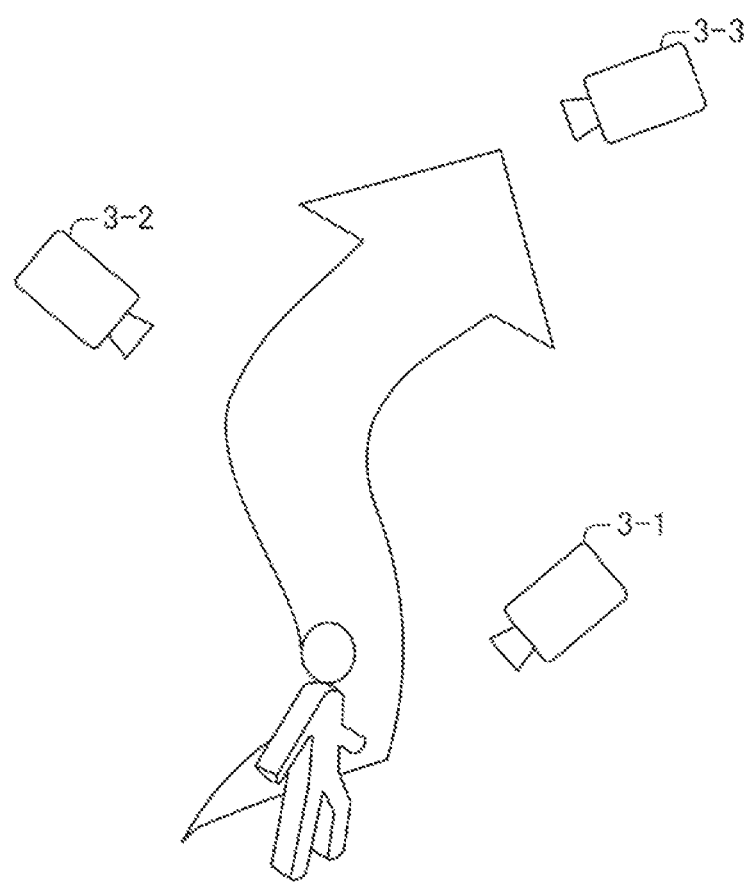
FIG. 6 is a view showing an example of a registration condition.
Figure 7:
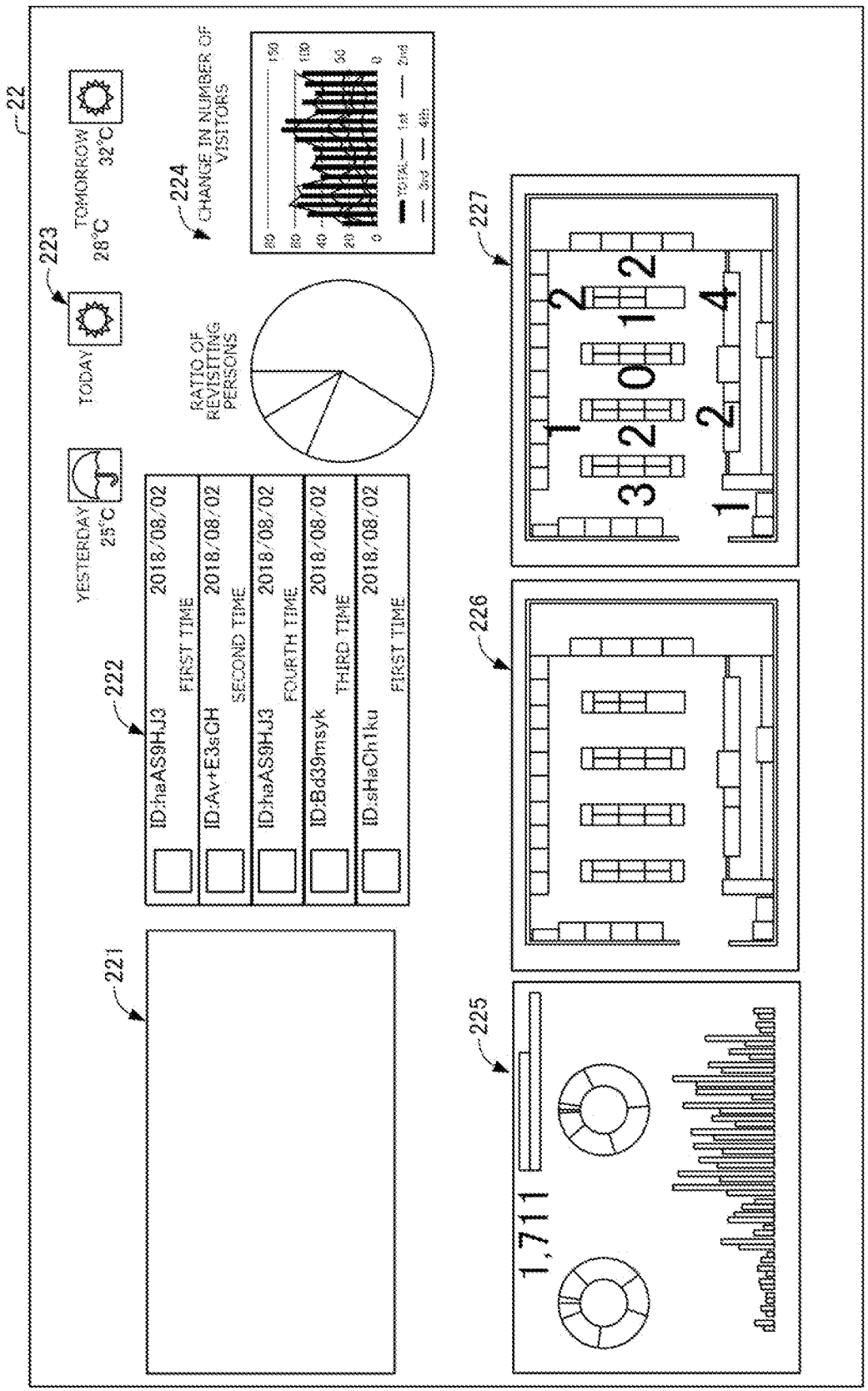
FIG. 7 is a view showing an example of an output by an output unit.
Figure 8:
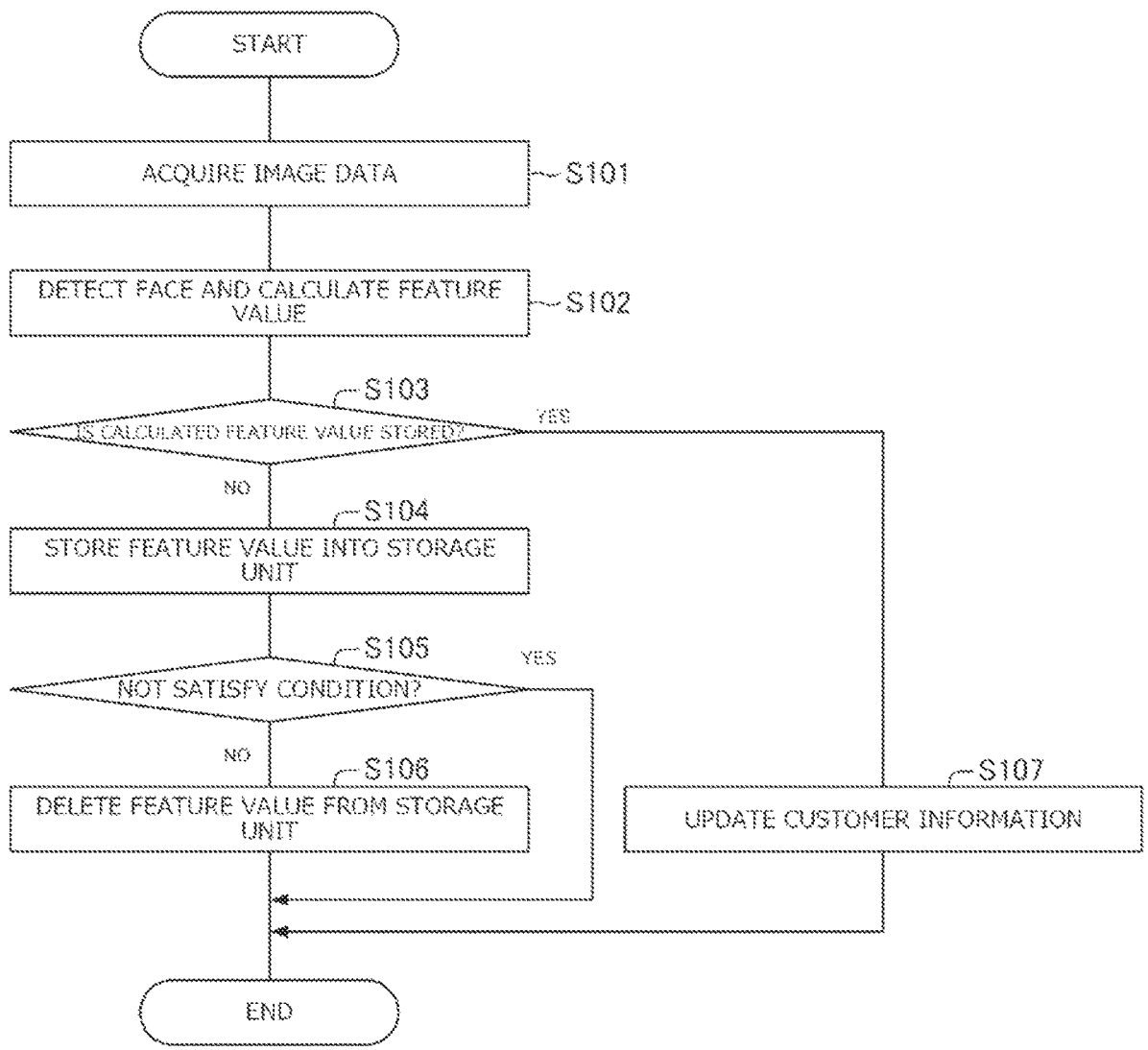
FIG. 8 is a flowchart showing an example of an operation of the customer information registration apparatus.

A first example embodiment of the present invention will be described with reference to FIGS. 1 to 8. FIG. 1 is a view showing an example of an entire configuration of a customer information registration system 1. FIG. 2 is a block diagram showing an example of a configuration of a customer information registration apparatus 2. FIG. 3 is a view showing an example of ancillary information 242. FIG. 4 is a view showing an example of customer information 243. FIG. 5 is a view showing an example of determination condition information 244. FIG. 6 is a view showing an example of a registration condition. FIG. 7 is a view showing an example of an output by an output unit 257. FIG. 8 is a flowchart showing an example of an operation of the customer information registration apparatus 2.

In the first example embodiment of the present invention, the customer information registration system 1 having the customer information registration apparatus 2 will be described. The customer information registration apparatus 2 stores information including a feature value calculated from a face image of a customer into a storage unit 24 as the customer information 243 for the purpose of utilizing for customer analysis such as repeater detection. As will be described later, the customer information registration apparatus 2 in this example embodiment matches face data of a customer against face data stored in the storage unit 24. Moreover, in a case where the matching fails (that is, in a case where acquired face data is not stored in the storage unit 24), the customer information registration apparatus 2 stores information including the face data into the storage unit 24 as the customer information 243. After that, the customer information registration apparatus 2 determines whether or not the behavior in a shop of the customer corresponding to the stored face data satisfies a given condition. Then, in a case where the behavior of the customer does not satisfy the given condition, the customer information registration apparatus 2 deletes the information including the face data stored in the storage unit 24. Herein, face data refers to a feature value calculated from a face image or the face image. In the following description, a case of employing the feature value as face data will be described.

FIG. 1 shows an example of an entire configuration of the customer information registration system 1. Referring to FIG. 1, the customer information registration system 1 has, for example, the customer information registration apparatus 2, a camera 3, and a cash register 4.

As shown in FIG. 1, the customer information registration apparatus 2 and the camera 3 are connected so as to be able to communicate with each other. Moreover, the customer information registration apparatus 2 and the cash register 4 are connected so as to be able to communicate with each other.

The configuration of the customer information registration system 1 is not limited to the case shown in FIG. 1. For example, the number of the cameras 3 and the number of the cash registers 4 may be one, or may be two or more. Moreover, for example, the customer information registration system 1 may have every kind of sensor such as a weight sensor installed on a product shelf or at the entrance of a shop, a RFID (radio frequency identifier) reader, and so on. Moreover, for example, the customer information registration system 1 may have no cash register 4.

The customer information registration apparatus 2 is an information processing apparatus in which a feature value is stored. FIG. 2 shows an example of a configuration of the customer information registration apparatus 2. Referring to FIG. 2, the customer information registration apparatus 2 has, as major components, an operation input unit 21, a screen display unit 22, a communication I/F unit 23, the storage unit 24, and an arithmetic logic unit 25.

The operation input unit 21 is formed by operation input devices such as a keyboard and a mouse. The operation input unit 21 detects an operation by an operator and outputs to the arithmetic logic unit 25.

The screen display unit 22 is formed by a screen display device such as an LCD (Liquid Crystal Display). The screen display unit 22 displays every kind of information on a screen in response to an instruction from the arithmetic logic unit 25. For example, the screen display unit 22 displays, on the screen, image data information 241, the ancillary information 242, the customer information 243, information based on the result of determination by a condition determination unit 255 and so on in response to an instruction from the arithmetic logic unit 25.

The communication I/F unit 23 is formed by a data communication circuit, for example. The communication I/F unit 23 performs data communication with every kind of device connected via a communication line. For example, the customer information registration apparatus 2 performs communication with the camera 3, the cash register 4, and an external device such as a sensor via the communication I/F unit 23.

The storage unit 24 is a memory unit such as a hard disk or a memory. In the storage unit 24, processing information necessary for every kind of processing in the arithmetic logic unit 25 and a program 245 are stored. The program 245 is loaded to and executed by the arithmetic logic unit 25 and thereby realizes every kind of processing unit. The program 245 is previously loaded from an external device or a recording medium via a data input/output function such as the communication I/F unit 23 and stored in the storage unit 24. Major information stored in the storage unit 24 are the image data information 241, the ancillary information 242, the customer information 243, and the determination condition information 244.

The image data information 241 is image data acquired from the camera 3 via the communication I/F unit 23. The image data information 241 is used by a feature value calculation unit 252 and an analysis unit 253, for example.

The ancillary information 242 indicates statistical data that does not identify an individual customer in a shooting site, such as the inside of a shop. The ancillary information 242 is generated by the analysis unit 253 based on the image data information 241, for example.

FIG. 3 shows an example of information which can be included as the ancillary information 242. Referring to FIG. 3, the ancillary information 242 can include every kind of statistical information such as visitor analysis information, number-of-passing-persons information, and conversion information, for example. Visitor analysis information is information indicating the number of customers for each attribute determined in advance, such as information obtained by counting the number of customers for each number of visits, information obtained by counting the number of customers for each number of visits before purchase, and information obtained by counting the number of customers for each age and gender. Moreover, number-of-passing-persons information is information indicating the number of customers passing through a predetermine site within a given time for each predetermined site. Moreover, conversion information is information indicating which area of the shop customers stay in for a long time, and can be used at the time of grasping the stay situations of customers.

The ancillary information 242 may include information other than the illustrated above. For example, the ancillary information 242 may include statistical information that does not identify an individual customer other than the illustrated above, such as heat map information and information indicating the number of customers for each weather.

The customer information 243 indicates information about a customer visiting the inside of a shooting area or a monitored area of the camera 3 in a shop or the like. The customer information 243 includes at least face feature value information indicating a feature value calculated from a face image of the customer. The customer information 243 can also include attribute information indicating the age, gender and so on of the customer determined from the face image, past visit information indicating the number of visits and the last visit date, behavior-related information (behavior information) that is information related to the behavior of the customer in a shooting area or a monitored area of the camera 3 in the shop or the like, and so on.

FIG. 4 shows an example of the customer information 243. Referring to FIG. 4, in the customer information 243, for example, an ID, face feature value information, attribute information, the number of visits, a last visit date, and behavior-related information are associated with each other. For example, in the first row of FIG. 4, an ID "Av+E3sCH", face feature value information "xxxxxxxxxx", attribute information "aaaaa", the number of visits "2", a last visit date "2018/07/20", and behavior-related information "XXXXXX" are associated with each other. As a result of storing face feature value information and behavior-related information in association with each other, for example, a marketer can know the grounds for storing the face feature value information in the storage unit 24.

Herein, an ID is identification information for identifying a customer. For example, an ID is automatically assigned by a matching unit 254 or the like when new face feature value information is stored in the storage unit 24. Face feature value information is information indicating the feature value of a face image. Face feature value information is calculated by the feature value calculation unit 252 to be described later based on the face image (the image data information 241). Attribute information is information indicating the attributes of a customer, such as age and gender. For example, attribute information is determined by the analysis unit 253 based on the image data information 241 or the like. The number of visits indicates the number of visits of a customer up to the last time (or including the present), and a last visit date indicates the date of the last visit of the customer. Visit information such as the number of visits and a last visit date is updated by, for example, the matching unit 254 or the like. Behavior-related information is information related to the behavior of a customer in a shooting area or a monitored area of the camera 3 such as the inside of a shop. Behavior-related information can include, for example, information indicating the number of cameras having captured the corresponding customer in one visit, the stay time of the customer in the entire shop or in each area when the inside of the shop is divided into a plurality of areas in advance, the presence or absence of detection of reaching for a product, the presence or absence of purchase of a product, the flow line of the customer, the line of sight of the customer, and so on.

FIG. 4 shows an example of the customer information 243. The information included in the customer information 243 is not limited to those illustrated in FIG. 3. For example, the customer information 243 may be composed of part of the information illustrated in FIG. 4 including face feature value information; for example, may be composed of only face feature value information. Moreover, the customer information 243 may include information other than those illustrated in FIG. 4, such as information indicating the weather and time when the customer visits the shop.

The determination condition information 244 is information indicating a condition used when the condition determination unit 255 determines whether or not to delete information (face feature value information) indicating a feature value stored in the storage unit 24.

The determination condition information 244 includes a condition according to a behavior of a customer in a shop. For example, the determination condition information 244 can include conditions such as "whether the feature value of the same person is calculated based on image data acquired from a predetermined given number (any number is acceptable) or more cameras", "whether the stay time (any time is acceptable) in the shop of the same person identified based on the feature value is equal or more than a given time, "whether reaching for a product is detected", "whether purchase of a product is detected based on an association with POS (Point of sale) information obtained from the cash register 4, or the like", "whether the stay time in a predetermined given area exceeds a predetermined threshold value based on tracking a flow line, or the like", and "whether the flow line of the person satisfies a given condition".

It is also conceivable to determine, for example, the number of registrations (the number of registered persons) of customer information in one day in consideration of the storage capacity of the storage unit 24. In this case, the determination condition information 244 can include a condition "whether the number of registered persons in one day is not exceeded". With this, even if the capacity of the storage unit 24 is limited, more useful information can be left in the storage unit 24. The number of registered persons may be a predetermined value or may be, for example, a value that changes according to the storage capacity of the storage unit 24, or the like.

Thus, the determination condition information 244 includes various conditions according to behaviors of customers in the shop. In other words, the determination condition information 244 includes a condition for determining whether or not it can be determined that a customer has an intention to purchase a product based on the behavior of the customer in the shop. Moreover, the determination condition information 244 includes a condition for determining whether or not it can be determined that a customer considers purchase of a product based on the behavior of the customer in the shop. By thus setting the determination condition information 244, for example, it is possible to delete information of a person who is inappropriate to be treated as a repeater, such as a person simply passing through in the shop, from the storage unit 24. That is to say, it is possible to leave only information of a customer who is appropriate for analysis such as repeater analysis in the storage unit 24.

The determination condition information 244 may include, for example, a condition other than the conditions illustrated above, such as "whether a weight change on a product shelf located in the vicinity of a customer is detected". In the case of the condition "whether a weight change on a product shelf located in the vicinity of a customer is detected", the condition determination unit 255 to be described later determines whether or not to store a feature value which is not included in the customer information 243 into the storage unit 24 based on a weight change when a customer picks up a product from a shelf equipped with a weight sensor.

Further, the determination condition information 244 may be information in which the abovementioned every kind of condition is associated with information indicating weight. FIG. 4 shows an example of the determination condition information 244 indicating the association between a condition and a weight. For example, in the first row of FIG. 4, a condition "calculate the feature value of the same person based on image data acquired from a predetermined number or more cameras" is associated with a weight "15". Moreover, in a case where the information indicating weight is included, the determination condition information 244 can include a weight threshold value that is a value to be compared with the total value of weights. The value of a weight associated with every kind of condition may be set to any value.

The arithmetic logic unit 25 has a microprocessor such as a MPU and a peripheral circuit thereof, loads the program 245 from the storage unit 24 and executes the program 245, and thereby makes the abovementioned hardware and the program 245 cooperate with each other and realizes various processing units. Major processing units realized by the arithmetic logic unit 25 are, for example, an image data acquisition unit 251, the feature value calculation unit 252, the analysis unit 253 (a behavior information acquisition unit), a matching unit 254 (a matching unit, a storing unit), the condition determination unit 255, a deletion unit 256, and the output unit 257.

The image data acquisition unit 251 acquires image data from the camera 3 via the communication I/F unit 23. Then, the image data acquisition unit 251 stores the acquired image data into the storage unit 24 as the image data information 241.

In a case where the customer information registration system 1 has a plurality of cameras 3, the image data acquisition unit 251 acquires image data from each of the plurality of cameras 3. In such a case, for example, the image data acquisition unit 251 can associate identification information of the camera 3 with the image data and store the associated information into the storage unit 24. In other words, the image data acquisition unit 251 can store image data into the storage unit 24 in a way that it can be determined which camera 3 has acquired the image data.

The feature value calculation unit 252 calculates the feature value of a face image. For example, the feature value calculation unit 252 extracts a face image (a face region) that is a region indicating the face of a customer from the image data information 241. Then, the feature value calculation unit 252 calculates the feature value of the extracted face image.

In this example embodiment, a process when the feature value calculation unit 252 calculates the feature value of a face image is not limited specifically. For example, the feature value calculation unit 252 can calculate the feature value of a face image by a known method; for example, calculate the feature value based on the position of a facial feature point such as eye, nose, or edge of mouth detected from the face image. It is needless to say that the feature value calculation unit 252 may calculate the feature value by using another known method, for example, by using luminance information or using a value according to the relationship between local regions.

Further, as described above, in a case where the customer information registration apparatus 2 has a plurality of cameras 3, the image data acquisition unit 251, for example, associates identification information of the camera 3 with the image data and stores the associated information into the storage unit 24. Therefore, the feature value calculation unit 252 can, for example, associate the calculated feature value of the face image and the identification information of the corresponding camera 3. In other words, the feature value calculation unit 252 can calculate the feature value in a way that it can be determined which camera 3 has acquired image data that the feature value has been calculated based on.

The analysis unit 253 analyzes image data indicated by the image data information 241 and a face image extracted from the image data, and thereby acquires attribute information indicating the gender and age of a customer, and acquires behavior-related information (behavior information) such as the stay time in the shop or in each area, the presence or absence of reaching for a product, detection of the flow line, and detection of the line of sight of the customer. Moreover, the analysis unit 253 analyzes image data indicated by the image data information 241 and a face image extracted from the image data, and thereby acquires statistical information that does not identify an individual customer, such as visitor analysis information, number-of-passing-persons information, and conversion information. Then, the analysis unit 253 stores the statistical information into the storage unit 24 as the ancillary information 242.

Thus, the analysis unit 253 can acquire attribute information and behavior-related information that are information for each customer and also acquire statistical information that does not identify an individual customer, based on the image data information 241. Moreover, the analysis unit 253 can acquire behavior-related information indicating whether a customer has purchased a product and what product the customer has purchased, for example, by associating the feature value of a face image with POS (Point of sale) information or the like acquired from the cash register 4. The processing by the analysis unit 253 may also be realized by using a known method such as estimation of gender and age based on a feature value. Therefore, a detailed description of the processing by the analysis unit 253 will be omitted.

The matching unit 254 confirms whether or not the feature value of a face image calculated by the feature value calculation unit 252 is already stored in the storage unit 24. For example, the matching unit 254 matches the feature value calculated by the feature value calculation unit 252 against face feature value information included in the customer information 243 stored in the storage unit 24, and thereby confirms whether or not the feature value of the face image calculated by the feature value calculation unit 252 is already stored in the storage unit 24.

In a case where face feature value information according to the calculated feature value is included in the customer information 243, the matching unit 254 determines that the feature value of the face image calculated by the feature value calculation unit 252 is already stored in the storage unit 24. In this case, the matching unit 254 can update the customer information 243. For example, the matching unit 254 can increase the number of visits corresponding to the matched feature value by 1 or update the last visit date in the customer information 243. An update unit may be provided, and the matching unit 254 may instruct the update unit to update. The matching unit 254 can also instruct the output unit 257 to output information indicating that a customer having a feature value stored in the storage unit 24 has visited the shop to the screen display unit 22 or the like. On the other hand, in a case where the calculated feature value is not included in the customer information 243 (that is, in a case where the matching fails), the matching unit 254 store the feature value into the storage unit 24. That is to say, the matching unit 254 stores face feature value information indicating the feature value to be stored into the storage unit 24 in association with the attribute information and the behavior-related information analyzed by the analysis unit 253. At this time, the number of visits is 1 and the last visit date is the date when the customer visits. A storing unit may be provided, and the matching unit 254 may instruct the storing unit to perform a storing process.

The condition determination unit 255 determines whether or not to delete a feature value stored in the storage unit 24. For example, the condition determination unit 255 determines whether or not to delete a feature value stored in the storage unit 24 based on whether or not it can be determined that the behavior of a customer in the shop shows the presence of an intention to purchase a product. To be specific, for example, the condition determination unit 255 confirms the result of feature value calculation by the feature value calculation unit 252 and the result of analysis by the analysis unit 253, and also confirms the determination condition information 244. Then, the condition determination unit 255 determines whether or not to delete the feature value stored in the storage unit 24 based on the behavior of the customer in the shop determined from the result of the feature value calculation by the feature value calculation unit 252, the behavior-related information (behavior information) acquired as a result of the analysis by the analysis unit 253, and so on, and based on a condition indicated by the determination condition information 244.

For example, the condition determination unit 255 determines whether or not to delete the feature value stored in the storage unit 24 based on whether or not the behavior of the customer in the shop satisfies a condition indicated by the determination condition information 244. For example, FIG. 5 shows an example of the behavior of the customer in the shop. FIG. 5 illustrates a case where the same customer is captured by three cameras 3 (camera 3-1, camera 3-2, camera 3-3) and thereafter leaves the shop. In such a state, it is assumed that a condition "feature values of the same person are calculated based on image data acquired from five or more cameras" is included in the determination condition information 244. In this case, since the same feature values are calculated based on the image data acquired from the three cameras, the condition determination unit 255 determines that the number of the cameras is not five or more and the behavior of the customer in the shop does not satisfy the condition indicated by the determination condition information 244. Moreover, it is assumed that the behavior of the customer does not satisfy another condition included by the determination condition information 244. In that case, the condition determination unit 255 determines to delete the feature value stored in the storage unit 24. Then, the condition determination unit 255 notifies to the deletion unit 256 that it determines to delete the feature value stored in the storage unit 24.

Thus, the condition determination unit 255 determines to delete a target feature value from the storage unit 24 when the behavior of a customer in the shop does not satisfy any of the conditions indicated by the determination condition information 244, such as "the feature values of the same person are calculated based on image data acquired from a predetermined given number or more cameras", "the stay time in the shop of the same person identified based on the feature values is equal to or more than a given time", "reaching for a product is detected", and "purchase of a product is detected based on an association with POS (Point of sale) information acquired from the cash register 4, or the like". Then, the condition determination unit 255 notifies to the deletion unit 256 that it determines to delete the feature value stored in the storage unit 24. On the other hand, in a case where the behavior of the customer in the shop satisfies any of the conditions indicated by the determination condition information 244, the condition determination unit 255 does not perform the above notification.

The condition determination unit 255 may be configured to determine whether or not to delete a target feature value from the storage unit 24 based on whether or not a predetermined number or more conditions indicated by the determination condition information 244 are satisfied. Moreover, the condition determination unit 255 may be configured to delete a target feature value from the storage unit 24 in a case where a condition indicated by the determination condition information 244 is satisfied. In a case where the condition determination unit 255 is thus configured, the determination condition information 244 can include a condition such as "the feature values of the same person are not calculated based on image data acquired from a predetermined given number or more cameras", for example.

Further, for example, the condition determination unit 255 can determine whether or not to delete a feature value stored in the storage unit 24 based on whether or not a value calculated based on the behavior of the customer in the shop exceeds a predetermined weight threshold value. For example, in a case where "the feature values of the same person are calculated based on image data acquired from a predetermined given number, that is, three or more cameras" and "the stay time in the shop of the same person identified based on the feature values exceeds a predetermined threshold value", the condition determination unit 255 obtains 15+10=25 (see FIG. 4). Thus, every time the behavior of the customer in the shop satisfies a given condition, the condition determination unit 255 adds a value associated with the condition. Then, in a case where the added value is equal to or less than a predetermined weight threshold value, the condition determination unit 255 determines to delete the feature value from the storage unit 24, and notifies to the deletion unit 256 that it determines to delete the feature value from the storage unit 24. On the other hand, in a case where the added value is more than the predetermined weight threshold value, the condition determination unit 255 does not perform the above notification.

Thus, the condition determination unit 255 determines whether or not to delete a feature value stored in the storage unit 24 based on the behavior of a customer in the shop.

In a case where the determination condition information 244 includes a condition about the number of registrations in one day of customer information (the number of finally registered persons; simply referred to as the number of registered persons hereinafter), the condition determination unit 255 can compare values calculated for respective customers based on the behaviors in the shop of the customers and rank the values in decreasing order (or increasing order) of value. Then, in a case where the number of persons (the number of temporarily registered persons) is more than the number of registered persons of the condition, the condition determination unit 255 can delete the feature value of a customer who is not in the top 10% of the total number of persons in decreasing order of value, for example. On the contrary, in a case where the number of persons is less than the number of registered persons of the condition, the condition determination unit 255 can complement the number of registered persons based on the rank up to the number of registered persons of the condition. Thus, the condition determination unit 255 may be configured to perform the determination according to the number of registered persons.

Further, the condition determination unit 255 may be configured to determine a condition at any timing. For example, the condition determination unit 255 may be configured to, with a camera provided at a cash register or the exit of a shop, perform the determination at a timing when the checkout processing of a product by a cash register is completed or at a timing when a customer leaves the shop, or may be configured to perform the determination of a condition at predetermined given intervals (for example, once a day).

The deletion unit 256 deletes a feature value determined to delete from the storage unit 24 by the condition determination unit 255. At this time, the deletion unit 256 also deletes information (ID, attribute information, and so on) associated with the feature value to be deleted as the customer information 243 together with the feature value (face feature value information). For example, the deletion unit 256 receives notification of determination to delete a feature value from the condition determination unit 255. Then, the deletion unit 256 deletes relevant information from the storage unit 24. That is to say, the deletion unit 256 deletes face feature value information and various information associated with the face feature value information. Since the deletion unit 256 thus performs deletion according to the result of determination by the condition determination unit 255, a feature value determined to delete from the storage unit 24 by the condition determination unit 255 does not remain in the storage unit 24.

The deletion unit 256 may be configured to perform the deletion process at any timing. For example, the deletion unit 256 may be configured to delete a feature value from the storage unit 24 without waiting upon receiving the result of determination by the condition determination unit 255, or may be configured to delete a feature value from the storage unit 24 at a given timing, for example, once a day in a batch.

Further, the deletion unit 256 can be configured to delete information resulting from a person to delete from the ancillary information 242 at the time of deleting a feature value. For example, the deletion unit 256 can decrease the count of customers corresponding to a feature value to be deleted by 1 in the visitor analysis information included by the ancillary information 242. Moreover, the deletion unit 256 can decrease the number of counts of a person to be deleted from the number-of-passing-persons information. Moreover, the deletion unit 256 can update the conversion information so as to assume that the person to be deleted does not exist from the beginning. The deletion unit 256 may instruct the analysis unit 253 to perform analysis of the image data information 241 again assuming that the person to be deleted does not exist from the beginning, or the deletion unit 256 may be configured to update the ancillary information 242 directly.

The output unit 257 instructs the screen display unit 22 or another external device to perform given output.

For example, the output unit 257 instructs the screen display unit 22 or the like to output information indicating that a customer having a feature value stored in the storage unit 24 visits the shop in response to notification from the matching unit 254. Moreover, the output unit 257 can instruct the screen display unit 22 or the like to output information according to the result of deletion by the deletion unit 256 (for example, statistical information such as the number of registrations newly registered without being deleted in one day and information relating to registered persons without being deleted). The instruction to output the information according to the result of deletion by the output unit 257 may be output at given intervals, for example, once a day at given time.

Further, for example, as shown in FIG. 7, the output unit 257 can instruct the screen display unit 22 to output the customer information 243 and so on together with image information 221 acquired by the camera 3, weather information 223, and so on. FIG. 7 shows an example of the display of the screen display unit 22 that is output as a result of the instruction by the output unit 257. Referring to FIG. 7, in response to an instruction from the output unit 257, for example, the image information 221, visiting customer information 222, the weather information 223, number-of-visits statistical information 224, attribute statistical information 225, conversion information 226, number-of-passing-persons information 227, and so on, can be displayed on the screen display unit 22.

Herein, the image information 221 indicates image data acquired from the camera 3 (the image data information 241). The visiting customer information 222 indicates information of customers visiting the shop at present. The vising customer information 222 can include at least part of the customer information 243. The weather information 223 indicates weather. In the case illustrated in FIG. 7, the weather information 223 indicates the weather for three days of yesterday, today, and tomorrow. The number-of-visits statistical information 224 indicates information indicating how many times each of the customers currently in the shop has visited the shop so far. The attribute statistical information 225 is information indicating the number of the customers by age and gender. The conversion information 226 is information indicating which area in the shop the customers stay in for a long time. The number-of-passing-persons information 227 is information indicating the number of passing persons within a given time. The number-of-visits statistical information 224, the attribute statistical information 225, the conversion information 226, and the number-of-passing-persons information 227 are associated with the ancillary information 242 acquired as a result of analysis by the analysis unit 253, for example.

Thus, the output unit 257 can instruct the screen display unit 22 to output the ancillary information 242, the customer information 243 and so on together with image data acquired by the image data acquisition unit 251. The output unit 257 may instruct the screen display unit 22 to output information other than the illustrated above.

The example of the configuration of the customer information registration apparatus 2 has been described above.

The camera 3 acquires image data. The camera 3 is, for example, installed in advance at a given position in a shop to monitor the inside of the shop. The camera 3 may be a known monitoring camera, or the like.

The cash register 4 manages sales information according to interactions with customers such as purchase of products. For example, the cash register 4 is equipped with a POS system. When a customer purchases a product, the cash register 4 can transmit information indicating that the customer has purchased the product to the customer information registration apparatus 2.

The example of the configuration of the customer information registration system 1 has been described above.

Next, an operation of the customer information registration apparatus 2 will be described. FIG. 8 is a flowchart showing an example of the operation of the customer information registration apparatus 2.

Referring to FIG. 8, the image data acquisition unit 251 acquires image data from the camera 3 via the communication I/F unit 23 (step S101). Then, the image data acquisition unit 251 stores the acquired image data as the image data information 241 into the storage unit 24.

The feature value calculation unit 252 calculates the feature value of a face image (step S102). For example, the feature value calculation unit 252 extracts a face image (a face region) that is a region indicating the face of a customer from the image data information 241. Then, the feature value calculation unit 252 calculates the feature value of the extracted face image.

The matching unit 254 confirms whether or not the feature value of the face image calculated by the feature value calculation unit 252 is already stored in the storage unit 24 (step S103). In a case where the calculated feature value is stored in the storage unit 24 (step S103, YES), the matching unit 254 updates the customer information 243 (step S107). Moreover, the matching unit 254 can instruct the output unit 257 to output information indicating that a customer having a feature value stored in the storage unit 24 has visited the shop to the screen display unit 22 or the like. On the other hand, in a case where the calculated feature value is not stored in the storage unit 24 (step S103, NO), the matching unit 254 stores the feature value calculated by the feature value calculation unit 252 into the storage unit 24 (step S104).

The condition determination unit 255 determines whether or not to delete the feature value stored in the storage unit 24 based on the behavior of the customer in the shop (step S105). In a case where the behavior of the customer in the shop does not satisfy a given condition (for example, a condition indicated by the determination condition information 244) (step S104, YES), the condition determination unit 255 determines to delete the feature value from the storage unit 24. Then, the condition determination unit 255 notifies the deletion unit 256 that it determines to delete the feature value from the storage unit 24. Consequently, the deletion unit 256 deletes the feature value from the storage unit 24 (step S106). That is to say, the deletion unit 256 deletes target face feature value information and various information associated with the face feature value information. On the other hand, in a case where the behavior of the customer in the shop satisfies the given condition (step S105, NO), the condition determination unit 255 does not perform the notification.

The example of the operation of the customer information registration apparatus 2 has been described above.

Thus, the customer information registration apparatus 2 has the condition determination unit 255 and the deletion unit 256. With such a configuration, the deletion unit 256 can delete a feature value determined to not satisfy a given condition by the condition determination unit 255 among feature values stored in the storage unit 24. As a result, only a feature value of a face image with high usefulness can be stored into the storage unit 24. Consequently, for example, the accumulation of information with low usefulness and probability can be suppressed, and the bloat of data capacity can be suppressed. Moreover, repeater detection can be performed efficiently.

Further, the condition determination unit 255 is configured to be able to determine whether or not to delete from the storage unit 24 based on a condition included in the determination condition information 244 in which various conditions according to the behaviors of customers in the shop are included. With such a configuration, for example, it becomes possible to suppress the bloat of information stored in the storage unit 24 caused by information of a person who is not inappropriate to be treated as a repeater, such as a person simply passing through in the shop, into the storage unit 24.

Further, in this example embodiment, the deletion unit 256 is configured to be able to delete information resulting from a person to delete from the ancillary information 242 at the time of deleting a feature value. Such a configuration enables acquisition of statistical information without including information of a person who is not inappropriate to be treated as a repeater, such as a person simply passing through in the shop.

In this example embodiment, a case of realizing the customer information registration apparatus 2 by one information processing apparatus has been described (see FIG. 2). However, the customer information registration apparatus 2 may be realized by a plurality of information processing apparatuses connected so as to be able to communicate via a network, for example.

Further, in this example embodiment, the determination condition information 244 is stored beforehand in the storage unit 24. However, every kind of condition indicated by the determination condition information 243 may be, for example, a condition obtained as a result of learning by a machine learning unit.

Further, in this example embodiment, a case in which the camera 3 is provided outside the customer information registration apparatus 2 is illustrated. However, the customer information registration apparatus 2 may have a function as the camera 3. The camera 3 may have a function as the customer information registration apparatus 2. That is to say, the camera 3 may be configured to have the respective functions described in this example embodiment.

Further, in this example embodiment, in a case where a feature value of a face image calculated by the feature value calculation unit 252 is stored in the storage unit 24, the matching unit 254 updates the customer information 243. The customer information registration apparatus 2 may be configured to also perform determination by the condition determination unit 255 after the update process. Moreover, the condition determination unit 255 can be configured to determine whether or not to correct the number of visits and the last visit date that are included in the customer information 243 based on the behavior of the customer in the shop.

Further, the customer information registration system 1 described in this example embodiment can be utilized not only as a system for efficiently detecting a repeater, but also as a system for efficiently detecting a suspicious person such as a shoplifter to whom the shop should pay attention, for example. In this case, the customer information registration apparatus 2 may be configured to store the feature value of a face image into the storage unit 24 when it can be determined based on the behavior of a customer in the shop that the customer has no intention to purchase a product.

Second Example Embodiment

Figure 9:
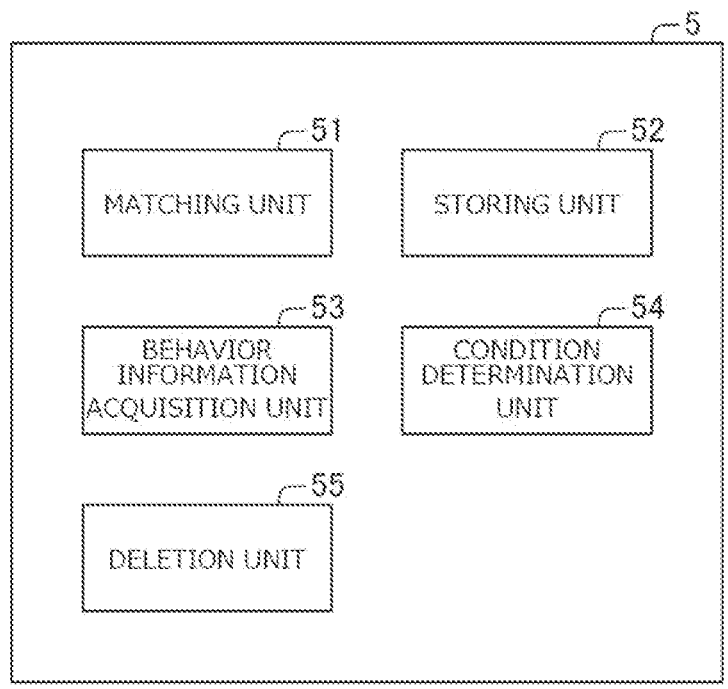
FIG. 9 is a block diagram showing an example of a configuration of a customer information registration apparatus in a second example embodiment of the present invention.

Next, with reference to FIGS. 9 and 10, a second example embodiment of the present invention will be described. In the second example embodiment, the overview of configurations of a customer information registration apparatus 5 and a customer information registration system 7 will be described.

First, with reference to FIG. 9, the customer information registration apparatus 5 will be described. FIG. 9 shows an example of the configuration of the customer information registration apparatus 5. Referring to FIG. 9, the customer information registration apparatus 5 has, for example, a matching unit 51, a storing unit 52, a behavior information acquisition unit 53, a condition determination unit 54, and a deletion unit 55.

For example, the customer information registration apparatus 5 has an arithmetic logic unit such as a CPU (Central Processing Unit), and a memory unit in which a program is stored. The customer information registration apparatus 5 realizes the respective processing units mentioned above by execution of the program stored in the memory unit by the arithmetic logic unit.

The matching unit 51 matches face data of a customer based on image data acquired by a camera in a shop against face data stored in the storage unit.

The storing unit 52 stores face data which is not stored in the storage unit into the storage unit when the matching by the matching unit 51 fails.

The behavior information acquisition unit 53 acquires behavior information according to a behavior in the shop of a customer. For example, the behavior information acquisition unit 53 acquires behavior information based on image data acquired by the camera in the shop. The behavior information acquisition unit 53 may acquire behavior information by a method other than illustrated above.

The condition determination unit 54 determines whether or not to delete the face data stored in the storage unit, based on the behavior information acquired by the behavior information acquisition unit 53.

The deletion unit 55 deletes the face data stored in the storage unit based on the result of determination by the condition determination unit 54.

Thus, the customer information registration apparatus 5 has the behavior information acquisition unit 53, the condition determination unit 54, and the deletion unit 55. With such a configuration, the deletion unit 55 can delete the face data stored in the storage unit in accordance with the result of determination by the condition determination unit 54 performed based on the behavior information acquired by the behavior information acquisition unit 53. As a result, it becomes possible to keep only face data of a face image with high usefulness stored in the storage unit. Consequently, for example, the accumulation of information with low usefulness and probability can be suppressed, and the bloat of data capacity can be suppressed.

Further, the customer information registration apparatus 5 described above can be realized by installation of a given program into the customer information registration apparatus 5. To be specific, a program as another aspect of the present invention is a program for causing a customer information registration apparatus having a storage unit to realize: the matching unit 51 that matches face data of a customer based on image data acquired by a camera in a shop against face data stored in the storage unit; the storing unit 52 that stores face data which is not stored in the storage unit into the storage unit when the matching fails; the behavior information acquisition unit 53 that acquires behavior information according to a behavior in the shop of the customer; the condition determination unit 54 that determines whether or not to delete the face data stored in the storage unit based on the behavior information acquired by the behavior information acquisition unit 53; and the deletion unit 55 that deletes the face data stored in the storage unit based on the result of determination by the condition determination unit 54.

Further, a customer information registration method executed by the customer information registration apparatus 5 described above is a method by which the customer information registration apparatus 5 having a storage unit matches face data of a customer based on image data acquired by a camera in a shop against face data stored in the storage unit, stores face data which is not stored in the storage unit into the storage unit when the matching fails, acquires behavior information according to a behavior in the shop of the customer, determines whether or not to delete the face data stored in the storage unit based on the acquired behavior information, and deletes the face data stored in the storage unit based on the result of the determination.

Further, every kind of function included by the customer information registration apparatus 5 described above may be included by a camera. To be specific, a camera as another aspect of the present invention is a camera which has: the matching unit 51 that matches face data of a customer based on acquired image data against face data stored in a storage unit; the storing unit 52 that stores face data which is not stored in the storage unit into the storage unit; the behavior information acquisition unit 53 that acquires behavior information according to a behavior in the shop of the customer; the condition determination unit 54 that determines whether or not to delete the face data stored in the storage unit based on the behavior information acquired by the behavior information acquisition unit 53; and the deletion unit 55 that deletes the face data stored in the storage unit based on the result of determination by the condition determination unit 54.

Figure 10:
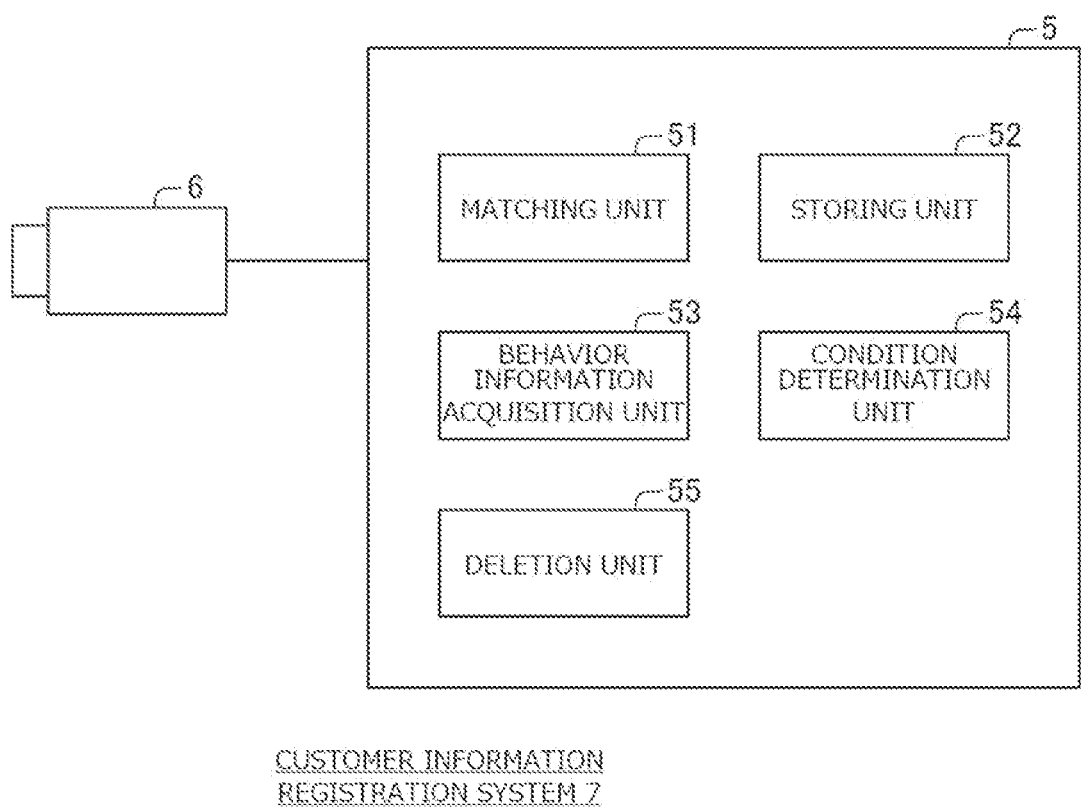
FIG. 10 is a block diagram showing an example of a configuration of a customer information registration system in the second example embodiment of the present invention.

Further, as shown in FIG. 10, the customer information registration system 7 may have a camera 6 that acquires image data and the customer information registration apparatus 5. In the case shown in FIG. 10, the camera 6 and the customer information registration apparatus 5 are connected so as to be able to communicate with each other. The configuration of the customer information registration apparatus 5 shown in FIG. 10 is the same as already described using FIG. 9. Therefore, a detailed description thereof will be omitted.

The inventions of the program, the customer information registration method, the camera, and the customer information registration system that have the configurations described above have the same effects and actions as the customer information registration apparatus 5, and therefore, can achieve the abovementioned object of the present invention. Moreover, a computer-readable recording medium on which the program is recorded has the same effects and actions as the customer information registration apparatus 5, and therefore, can achieve the abovementioned object of the present invention.

<Supplementary Notes>

The whole or part of the example embodiments disclosed above can be described as the following supplementary notes. The overview of the customer information registration apparatus and so on according to the present invention will be described below. However, the present invention is not limited to the following configurations.

(Supplementary Note 1)

A customer information registration apparatus comprising:
- a matching unit configured to match face data of a customer based on image data acquired by a camera in a shop against face data stored in a storage unit;
- a storing unit configured to store face data which is not stored in the storage unit into the storage unit in a case where the matching by the matching unit fails;
- a behavior information acquisition unit configured to acquire behavior information according to a behavior in the shop of the customer;
- a condition determination unit configured to determine whether or not to delete the face data stored in the storage unit based on the behavior information acquired by the behavior information acquisition unit; and
- a deletion unit configured to delete the face data stored in the storage unit based on a result of the determination by the condition determination unit.

(Supplementary Note 2)

The customer information registration apparatus according to Supplementary Note 1, wherein the condition determination unit is configured to determine whether or not to delete the face data stored in the storage unit based on whether or not it is determined from the behavior information that the customer intends to purchase a product or the customer has considered purchase of a product.

(Supplementary Note 3)

The customer information registration apparatus according to Supplementary Note 1 or 2, wherein the condition determination unit is configured to determine whether or not to delete the face data stored in the storage unit based on whether or not the behavior of the customer indicated by the behavior information satisfies a predetermined determination condition.

(Supplementary Note 4)

The customer information registration apparatus according to Supplementary Note 3, wherein the condition determination unit is configured to determine to delete the face data stored in the storage unit in a case where the behavior of the customer indicated by the behavior information does not satisfy the predetermined determination condition.

(Supplementary Note 5)

The customer information registration apparatus according to Supplementary Note 1 or 2, wherein the condition determination unit is configured to determine whether or not to delete the face data stored in the storage unit based on whether or not a value according to the behavior of the customer indicated by the behavior information exceeds a predetermined weight threshold value.

(Supplementary Note 6)

The customer information registration apparatus according to Supplementary Note 5, wherein the condition determination unit is configured to determine to delete the face data stored in the storage unit in a case where the value according to the behavior of the customer in the shop indicated by the behavior information is equal to or less than the weight threshold value.

(Supplementary Note 7)

The customer information registration apparatus according to Supplementary Note 1 or 2, wherein the condition determination unit is configured to compare values between customers calculated for the respective customers according to the behavior of the customer in the shop indicated by the behavior information, and determine whether or not to delete the face data stored in the storage unit based on a result of the comparison.

(Supplementary Note 8)

The customer information registration apparatus according to any one of Supplementary Notes 1 to 7, wherein:
- the behavior information acquisition unit is configured to acquire the behavior information and also acquire ancillary information, the ancillary information being statistical data which does not identify an individual customer in a shooting site of the camera; and
- the deletion unit is configured to delete the face data stored in the storage unit and also delete information resulting from a person to delete from the ancillary information.

(Supplementary Note 9)

The customer information registration apparatus according to any one of Supplementary Notes 1 to 8, comprising an output unit configured to perform given output according to a result of the determination by the condition determination unit.

(Supplementary Note 10)

The customer information registration apparatus according to any one of Supplementary Notes 1 to 9, wherein the behavior information acquisition unit is configured to acquire the behavior information based on the image data acquired by the camera.

(Supplementary Note 11)

A customer information registration method executed by a customer information registration apparatus including a storage unit, the method comprising:
- matching face data of a customer based on image data acquired by a camera in a shop against face data stored in the storage unit;
- storing face data which is not stored in the storage unit into the storage unit in a case where the matching fails;
- acquiring behavior information according to a behavior in the shop of the customer;
- determining whether or not to delete the face data stored in the storage unit based on the acquired behavior information; and
- deleting the face data stored in the storage unit based on a result of the determination.

(Supplementary Note 12)

A non-transitory computer-readable recording medium having a program recorded thereon, the program comprising instructions for causing a customer information registration apparatus including a storage unit to realize:

a matching unit configured to match face data of a customer based on image data acquired by a camera in a shop against face data stored in a storage unit;

a storing unit configured to store face data which is not stored in the storage unit into the storage unit in a case where the matching by the matching unit fails;

a behavior information acquisition unit configured to acquire behavior information according to a behavior in the shop of the customer;

a condition determination unit configured to determine whether or not to delete the face data stored in the storage unit based on the behavior information acquired by the behavior information acquisition unit; and a deletion unit configured to delete the face data stored in the storage unit based on a result of the determination by the condition determination unit.

(Supplementary Note 13)

A camera comprising:

a matching unit configured to match face data of a customer based on acquired image data against face data stored in a storage unit;

a storing unit configured to store face data which is not stored in the storage unit into the storage unit in a case where the matching by the matching unit fails;

a behavior information acquisition unit configured to acquire behavior information according to a behavior in the shop of the customer;

a condition determination unit configured to determine whether or not to delete the face data stored in the storage unit based on the behavior information acquired by the behavior information acquisition unit; and a deletion unit configured to delete the face data stored in the storage unit based on a result of the determination by the condition determination unit.

(Supplementary Note 14)

A customer information registration system comprising a customer information registration apparatus and a camera, the customer information registration apparatus comprising:

a matching unit configured to match face data of a customer based on image data acquired by a camera in a shop against face data stored in a storage unit;

a storing unit configured to store face data which is not stored in the storage unit into the storage unit in a case where the matching by the matching unit fails;

a behavior information acquisition unit configured to acquire behavior information according to a behavior in the shop of the customer;

a condition determination unit configured to determine whether or not to delete the face data stored in the storage unit based on the behavior information acquired by the behavior information acquisition unit; and a deletion unit configured to delete the face data stored in the storage unit based on a result of the determination by the condition determination unit.

The program described in the example embodiments and supplementary note is stored in a storage unit, or recorded on a computer-readable recording medium. For example, the recording medium is a portable medium such as a flexible disk, an optical disk, a magnetooptical disk, and a semiconductor memory.

Although the present invention has been described above with reference to the example embodiments, the present invention is not limited to the example embodiments. The configurations and details of the present invention can be changed in various manners that can be understood by one skilled in the art within the scope of the present invention.

The present invention is based upon and claims the benefit of priority from Japanese patent application No. 2018-180213, filed on Sep. 26, 2018, the disclosure of which is incorporated herein in its entirety by reference.

DESCRIPTION OF NUMERALS 1 customer information registration system
2 customer information registration apparatus
21 operation input unit
22 screen display unit
221 image information
222 visiting customer information
223 weather information
224 number-of-visits statistical information
225 attribute statistical information
226 conversion information
227 number-of-passing-persons information
23 communication I/F unit
24 storage unit
241 image data information
242 ancillary information
243 customer information
244 determination condition information
245 program
25 arithmetic logic unit
251 image data acquisition unit
252 feature value calculation unit
253 analysis unit
254 matching unit
255 condition determination unit
256 deletion unit
257 output unit
3 camera
4 cash register
5 customer information registration apparatus
51 matching unit
52 storing unit
53 behavior information acquisition unit
54 condition determination unit
55 deletion unit
6 camera
7 customer information registration system

What is claimed is:

1. A customer information registration apparatus comprising:

at least one memory configured to store instructions; and at least one hardware processor configured to execute the instructions to:

match face data of a current customer based on image data acquired by a camera in a shop against face data of a known customer stored as part of information of the known customer in a storage;

in response to unsuccessfully matching the face data of the current customer against the face data of the known customer, store the face data of the current customer as part of information of the current customer in the storage;

acquire behavior information according to a behavior of the current customer in the shop;

determine whether or not the information of the current customer, including the face data of the current customer, should be deleted from the storage based on the acquired behavior information; and in response to determining that the information of the current customer should be deleted from the storage, delete the information of the current customer, including the face data of the current customer, from the storage.

2. The customer information registration apparatus according to claim 1, wherein the at least one hardware processor is configured to execute the instructions to determine whether or not the information of the current customer should be deleted from the storage based on a result of determining, from the behavior information, whether or not the current customer intends to purchase a product or has considered a product purchase.

3. The customer information registration apparatus according to claim 1, wherein the at least one hardware processor is configured to execute the instructions to determine whether or not the information of the current customer should be deleted from the storage based on whether or not the behavior of the current customer indicated by the behavior information satisfies a predetermined determination condition.

4. The customer information registration apparatus according to claim 3, wherein the at least one hardware processor is configured to execute the instructions to determine to delete the information of the current customer, including the face data of the current customer, from in the storage in response to the behavior of the current customer indicated by the behavior information not satisfying the predetermined determination condition.

5. The customer information registration apparatus according to claim 1, wherein the at least one hardware processor is configured to execute the instructions to determine whether or not the information of the current customer should be deleted from the storage based on whether or not a value according to the behavior of the current customer indicated by the behavior information exceeds a predetermined weight threshold value.

6. The customer information registration apparatus according to claim 5, wherein the at least one hardware processor is configured to execute the instructions to determine to delete the information of the current customer, including the face data of the current customer, from in the storage in response to the value according to the behavior of the customer in the shop indicated by the behavior information being equal to or less than the weight threshold value.

7. The customer information registration apparatus according to claim 1, wherein the at least one hardware processor is configured to execute the instructions to determine whether or not the information of the current customer should be deleted from the storage based on a result of a comparison of a value of the current customer based on the behavior of the current customer and a value of a different customer based on a behavior of the different customer in the shop.

8. The customer information registration apparatus according to claim 1, wherein the at least one hardware processor is configured to execute the instructions to:
acquire in addition to the behavior information, ancillary information that is statistical data that does not identify any individual customer in a shooting site of the camera; and in response to determining that the information of the current customer should be deleted from the storage, also delete information regarding the current customer from the ancillary information.

9. The customer information registration apparatus according to claim 1, wherein the at least one hardware processor is configured to execute the instructions to perform given output based on a result of determining whether the information of the current customer should be deleted from the storage.

10. The customer information registration apparatus according to claim 1, wherein the at least one hardware processor is configured to execute the instructions to acquire the behavior information based on the image data acquired by the camera.

11. A customer information registration method executed by a customer information registration apparatus including a storage unit, the method comprising:
matching face data of a current customer based on image data acquired by a camera in a shop against face data of a known customer stored as part of information of the known customer in the storage;
in response to unsuccessfully matching the face data of the current customer against the face data of the known customer, storing the face data of the current customer as part of information of the current customer in the storage;
acquiring behavior information according to a behavior of the current customer in the shop;
determining whether or not the information of the current customer, including the face data of the current customer, should be deleted from the storage unit based on the acquired behavior information; and
in response to determining that the information of the current customer should be deleted from the storage, deleting the information of the current customer, including the face data of the current customer, from in the storage.

12. A non-transitory computer-readable recording medium storing a program executable by a customer information registration apparatus including a storage to perform:
matching face data of a current customer based on image data acquired by a camera in a shop against face data of a known customer stored as part of information of the known customer in the storage;
in response to unsuccessfully matching the face data of the current customer against the face data of the known customer, storing the face data of the current customer as part of information of the current customer in the storage;
acquiring behavior information according to a behavior of the current customer in the shop;
determining whether or not the information of the current customer, including the face data of the current customer, should be deleted from the storage based on the acquired behavior information; and
in response to determining that the information of the current customer should be deleted from the storage, deleting the information of the current customer, including the face data of the current customer, from the storage.

* * * * *